Nov. 13, 1951

D. E. HOWES 2,575,109

SELECTIVE AMPLIFIER

Filed Oct. 26, 1945

INVENTOR.
DOUGLAS E. HOWES

BY

William D. Hall

ATTORNEY

Patented Nov. 13, 1951 2,575,109

UNITED STATES PATENT OFFICE 2,575,109

SELECTIVE AMPLIFIER

Douglas E. Howes, Northfield, Vt., assignor to the United States of America as represented by the Secretary of War Application October 26, 1945, Serial No. 624,912

2 Claims. (Cl. 250—27)

This invention relates generally to an electrical circuit and more particularly to a selective amplifier in a radio receiver.

In the copending application of Malcom W. P. Strandberg, Serial No. 623,387, entitled "Frequency Finder System," and filed October 19, 1945, there is disclosed an automatic carrier frequency finder for a pulsed radio system. In the Strandberg system an oscillator-detector is caused to scan a predetermined band of radio frequencies. When, during the scanning, an incoming signal pulse is encountered, the oscillator-detector will produce as its output a series of pulses. The frequencies of these output pulses coincide first with the frequencies contained in the sidebands of the incoming pulse and then, as the oscillator-detector frequency continues to change, the carrier frequency. When the carrier frequency is encountered, a selective amplifier, receiving the output of the oscillator-detector, produces in its output a controlling impulse. This controlling impulse stops the scanning mechanism and allows the oscillator-detector to oscillate at the carrier frequency of the input signal and to emit a signal of the same radio frequency as that which is being received.

It is an object of this invention to provide in a radio receiver a selective amplifier circuit of relatively high selectivity.

Another object is to enable the selectivity of said selective amplifier circuit to be relatively constant over a fairly large range of signal strength inputs.

Figure 1:
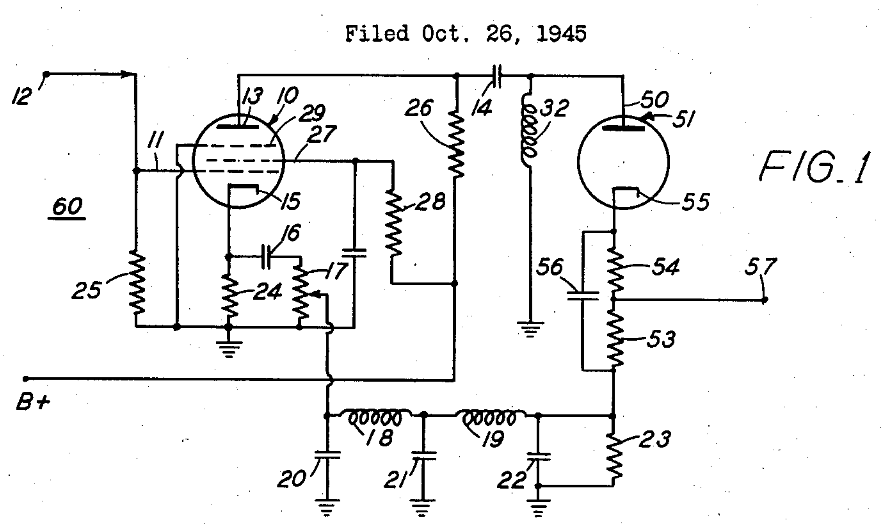
Figure 2:
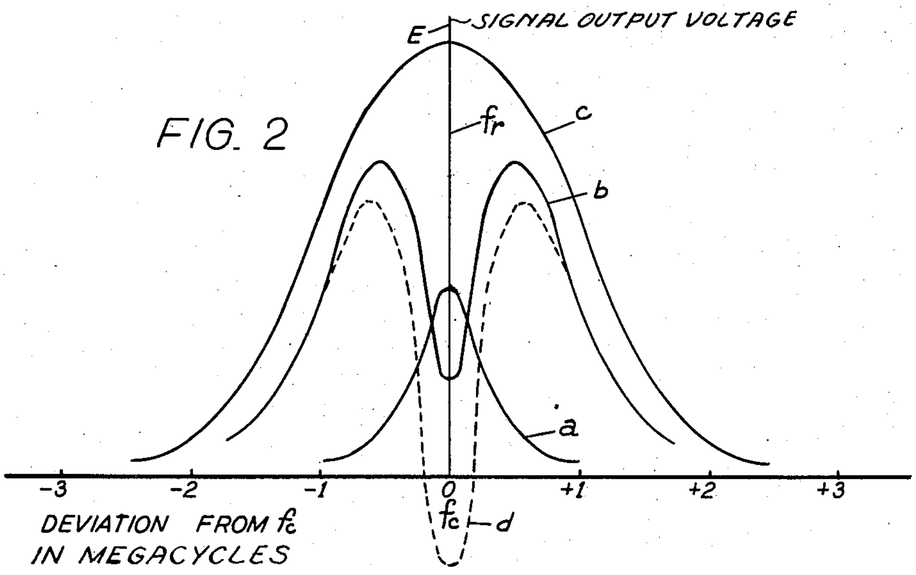
Figure 3:
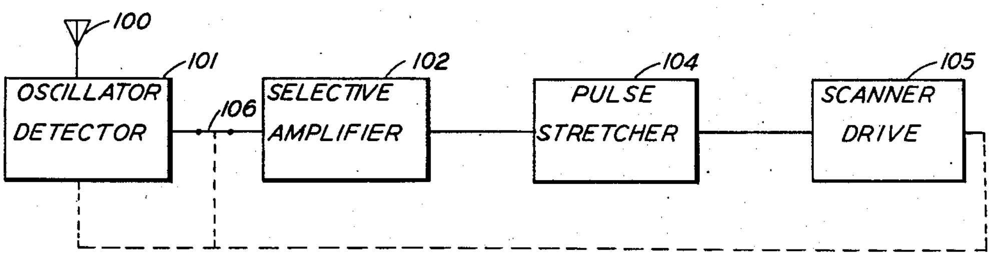

Other objects, features and advantages of this invention will suggest themselves to those skilled in the art and will become apparent from the following description of the invention taken in connection with the accompanying drawings in which:

Fig. 1 is a circuit diagram embodying the principles of this invention;

Fig. 2 comprises curves which will be used to explain the operation of this circuit; and Fig. 3 is a block diagram of apparatus in which this invention may be used.

Referring more specifically to Fig. 1, a signal is applied through the terminal 12 of selective amplifier 60 to grid 11 of amplifier tube 10. One of the outputs derived from the amplifier tube 10 is taken from anode 13 and is applied through condenser 14 to anode 51 of diode 50. The combination of inductance 32, which is connected from anode 51 of diode 50 to ground, and condenser 14 affords a selective circuit having characteristics similar to a high-pass filter.

The second output of amplifier 10 is taken from cathode 15 and applied through coupling condenser 16 and potentiometer 17 to a low-pass filter composed of inductances 18 and 19, capacitor 20, capacitor 21, capacitor 22 and terminating resistance 23. Cathode 15 of amplifier tube 10 is returned to ground through a cathode load resistor 24. Control grid 11 of amplifier tube 10 is returned to ground through resistor 25. Anode 13 of amplifier 10 is returned through resistance 26 to a suitable positive potential source designated B+. Screen grid 27 of amplifier tube 12 is returned through resistor 28 to the positive potential source B+. Suppressor grid 29 of amplifier tube 10 is returned directly to ground.

The output of the above mentioned low-pass filter is taken from the terminating resistance 23 and applied through resistances 53 and 54 to cathode 55 of diode 50. The series combination of resistor 53 and 54 is shunted with bypass capacitor 56.

The outputs of the low and high-pass filters are combined in phase opposition in diode 50. The output of diode 50 is taken from the common connection of resistors 53 and 54 and appears at output terminal 57 of selective amplifier 60. The relative magnitudes of the signals from the low and high-pass filters may be controlled by potentiometer 17, as shown, or by controlling the ratio of the resistances 53 and 54 by suitable means, not shown.

As is well known, a pulse-modulated radio-frequency signal contains a carrier frequency plus many side band frequencies. The carrier frequency essentially transmits the signal while the side band frequencies modify the carrier envelope to produce a series of pulses.

When a pulse-modulated radio-frequency signal is detected, a series of video pulses corresponding to the radio-frequency pulses is produced. In heterodyne detection the side band frequency of the video pulses will be symmetric about a particular video frequency, or carrier frequency. In D.-C. detection the side band frequencies of the D.-C. pulses are spaced from a frequency of zero. For simplicity of explanation in the case of D.-C. detection, the frequency of zero will hereinafter be known as the carrier frequency.

In explaining the operation of the circuit of this invention, it will be assumed that the selective amplifier 60 receives in its input D.-C. detected, video pulses. Briefly, selective amplifier 60 will produce in its output a controlling impulse each time the carrier frequency of an input pulse coincides with the reference frequency of the selective amplifier.

The frequency response curves of the various circuits in selective amplifier 60 as they apply to the incoming signals are shown in Fig. 2. In Fig. 2 the absolute magnitude of the signal output voltage E is plotted against the deviation from the carrier frequency of the input signal which is also the deviation from the reference frequency of the pulse in the selective amplifier. Curve C represents the frequency band coverage of the incoming signal before it is converted into a low frequency band by D.-C. detection. As the detection is considered to be linear the curve may be considered to also represent detector output signal strengths at the frequencies covered. The actual band of frequencies acted on by the selective amplifier would be that band represented by one half of the curve C on either side of the reference frequency $f_r$. This band of frequencies extends from zero frequency at the reference line $f_r$ to the limit of curve C. Curves A, B, and D are the effective joint results of the action of the selective amplifier and the frequency band coverage of the incoming signal as the results would appear in the outputs. Curve *a* of Fig. 2 shows the frequency response curve resulting from the effect of the low-pass filter section on the pulse. This low-pass filter is designed so that a signal input near the filter reference frequency $f_r$ appears with the greatest amplitude at the output of the filter.

Curve *b* of Fig. 2 shows the frequency response curve corresponding to the effect of the high-pass filter on the pulse. This high-pass filter is designed so that a signal input near the filter reference frequecy, $f_r$, appears of lesser magnitude than the higher sideband frequencies passed. The design of low and high pass filters of the characteristics cited above is well known in the art.

The combined output response curve corresponding to the combined effect of both the low and the high-pass filters is shown by curve *d* of Fig. 2. Curve *d* is obtained by subtracting the response curve of the low-pass filters as indicated by curve *a* of Fig. 2 from the response of the high-pass filter as indicated by curve *b* of Fig. 2.

Curve *c* of Fig. 2 shows the relative amplitudes of the frequencies contained in an input video pulse of carrier frequency, $f_c$, to the selective amplifier. For purposes of explanation, it will be assumed that the carrier frequency of the input video pulse, $f_c$, coincides with the reference frequencies, $f_r$, of the selective amplifier filter sections.

Examination of curves *a* and *b* of Fig. 2 shows that for a narrow band of frequencies on either side of the reference frequency, the output of the low-pass filter will exceed the output of the high-pass filter. Therefore, when the carrier frequency of the pulse input coincides with the reference frequency of the filter circuits, a controlling impulse will appear at output terminal 57 of selective amplifier 60. The magnitude of the low-pass filter output is adjusted, in this embodiment, by potentiometer 17.

The band width of a circuit is that band of frequencies between points of .707 of the maximum value of the signal output voltage. In this embodiment the band width of the combined output response curve increases only slightly with an increase in signal strength. Therefore, the circuit selectivity is essentially independent of the signal strength of the input pulse.

This circuit is well adapted for use in a carrier frequency finder circuit for a radio receiver. A block diagram of the carrier frequency finder circuit as described in connection with the patent application cited previously and using the selective amplifier disclosed in this application is shown in Fig. 3.

In Fig. 3 a pulse-modulated radio-frequency input signal is applied through antenna 100 to variable oscillator-detector 101. As the frequency of the oscillator-detector passes through the sideband frequencies of the input pulse and reaches the carrier frequency, the oscillator-detector will produce in its output a series of D.-C. pulses. Selective amplifier 102 receives said series of D.-C. pulses through switch 106 and produces a controlling impulse whenever the carrier frequency of the input pulse coincides with the reference frequency of the selective amplifier. The controlling impulse from the selective amplifier is lengthened in pulse stretcher 104. The output of pulse stretcher 104 actuates scanner drive 105. Scanner drive 105 is mechanically coupled to the frequency varying means in the oscillator detector 101, and also to switch 106. When the scanner drive mechanism receives a controlling impulse, it immediately stops and the detector-oscillator then oscillates at the carrier frequency of the input pulse and emits a continuous signal of the same frequency as that which is being received. Whenever the output of pulse stretcher 104 continues for a predetermined period, switch 106 is opened and the oscillator detector is isolated from the remainder of the circuit.

While there has been described what is at present considered to be the preferred embodiment of this invention it will be obvious to those skilled in the art that various changes and modifications may be made therein without departing from the scope of the invention as set forth in the appended claims.

What is claimed is:

1. A selective amplifier circuit comprising a vacuum tube having a grid input circuit, an anode output circuit, and a cathode output circuit, said input circuit responsive to a plurality of frequencies, frequency sensitive means associated with said anode output circuit responsive to an upper band of said plurality of frequencies, frequency sensitive means associated with said cathode output circuit responsive to a lower band of said plurality of frequencies, a diode connected to said anode output circuit, output load means for combining said diode and cathode outputs so that any cathode output signals of one polarity in said upper band of frequencies are cancelled by the diode signals, providing a sharp cutoff of signals of said one polarity.

2. A selective amplifier circuit comprising a vacuum tube having an input circuit and a first and second output circuits, said input circuit responsive to a plurality of frequencies, frequency sensitive means associated with said first output circuit responsive to an upper band of said plurality of frequencies, frequency sensitive means associated with said second output circuit responsive to a lower band of said plurality of frequencies, rectifier means connected to said first output circuit and output load means for combining the rectifier and second outputs in phase opposition.

DOUGLAS E. HOWES.

REFERENCES CITED

The following references are of record in the file of this patent:

UNITED STATES PATENTS

| Number | Name | Date |
|---|---|---|
| 1,559,864 | Fry | Nov. 3, 1925 |
| 1,902,031 | Holden | Mar. 21, 1933 |
| 1,954,295 | Hinman | Apr. 10, 1934 |
| 2,026,613 | Chireix | Jan. 7, 1936 |
| 2,229,703 | Larsen | Jan. 28, 1941 |

OTHER REFERENCES

"The Radio Amateur's Handbood," 1946 edition, pages 46–47.